United States Patent
Malboubi et al.

(10) Patent No.: US 10,893,424 B1
(45) Date of Patent: Jan. 12, 2021

(54) CREATING AND USING CELL CLUSTERS

(71) Applicant: AT&T Intellectual Property I, L.P., Atlanta, GA (US)

(72) Inventors: Mehdi Malboubi, San Ramon, CA (US); Abhijeet Bhorkar, Fremont, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/841,816

(22) Filed: Apr. 7, 2020

(51) Int. Cl.
*H04W 24/02* (2009.01)
*H04W 16/12* (2009.01)
*G06N 3/04* (2006.01)
*H04W 16/18* (2009.01)
*H04W 24/08* (2009.01)
*G06N 3/08* (2006.01)
*H04W 16/10* (2009.01)

(52) U.S. Cl.
CPC .......... *H04W 24/02* (2013.01); *G06N 3/0454* (2013.01); *G06N 3/08* (2013.01); *H04W 16/10* (2013.01); *H04W 16/12* (2013.01); *H04W 16/18* (2013.01); *H04W 24/08* (2013.01)

(58) Field of Classification Search
CPC ............ H04W 52/325; H04W 52/346; H04W 52/146; H04W 28/18; H04W 52/228; H04W 16/18; H04W 24/02; H04W 24/08; H04W 52/242; H04W 72/12; H04W 76/15; H04W 76/19
See application file for complete search history.

(56) References Cited

U.S. PATENT DOCUMENTS

2017/0041806 A1* 2/2017 Randall ................ H04W 16/18
2018/0184344 A1* 6/2018 Periyasamy .... H04W 36/00837

OTHER PUBLICATIONS

Le et al., "Applying Big Data, Machine Learning, and SDN/NFV to 5G Traffic Clustering, Forecasting, and Management," 2018 IEEE International Conference on Network Softwarization—Technical Sessions, Jun. 25-29, 2018, IEEE 2018.
Joud et al., "User Specific Cell Clustering to Improve Mobility Robustness in 5G Ultra-dense Cellular Networks," 2018 14th Annual Conference on Wireless On-demand Network Systems and Services, Feb. 6-8, 2018, IFIP 2018.

* cited by examiner

*Primary Examiner* — Kwasi Karikari
(74) *Attorney, Agent, or Firm* — Hartman & Citrin LLC

(57) ABSTRACT

Concepts and technologies are disclosed for creating and using cell clusters. Cellular network data associated with a cellular network can be obtained. The cellular network data can include configuration data associated with a cell of the cellular network and a performance indicator associated with the cellular network. A number of cell clusters to be generated can be determined, and the cell clusters can be generated. The cell clusters can include a cell cluster that can represent multiple cells including the cell. A model that represents the cell cluster can be trained. An input cluster that represents multiple inputs can be generated. The inputs can be associated with the multiple cells and the input cluster can include a value. The value can be provided as input to the model to obtain a predicted output associated with the cell cluster.

20 Claims, 8 Drawing Sheets

FIG. 2A
| Record | Cell | Configuration Data | Environmental Data | Event Data | Performance Data | Input Data | ... | Other Data |
|---|---|---|---|---|---|---|---|---|
| 1 | $CELL_1$ | $VALUE_{1-1}$ | $VALUE_{1-2}$ | $VALUE_{1-3}$ | $VALUE_{1-4}$ | $VALUE_{1-5}$ | ... | $VALUE_{1-m}$ |
| 2 | $CELL_2$ | $VALUE_{2-1}$ | $VALUE_{2-2}$ | $VALUE_{2-3}$ | $VALUE_{2-4}$ | $VALUE_{2-5}$ | ... | $VALUE_{2-m}$ |
| 3 | $CELL_3$ | $VALUE_{3-1}$ | $VALUE_{3-2}$ | $VALUE_{3-3}$ | $VALUE_{3-4}$ | $VALUE_{3-5}$ | ... | $VALUE_{3-m}$ |
| ... | ... | ... | ... | ... | ... | ... | ... | ... |
| $n$ | $CELL_P$ | $VALUE_{n-1}$ | $VALUE_{n-2}$ | $VALUE_{n-3}$ | $VALUE_{n-4}$ | $VALUE_{n-5}$ | ... | $VALUE_{n-m}$ |
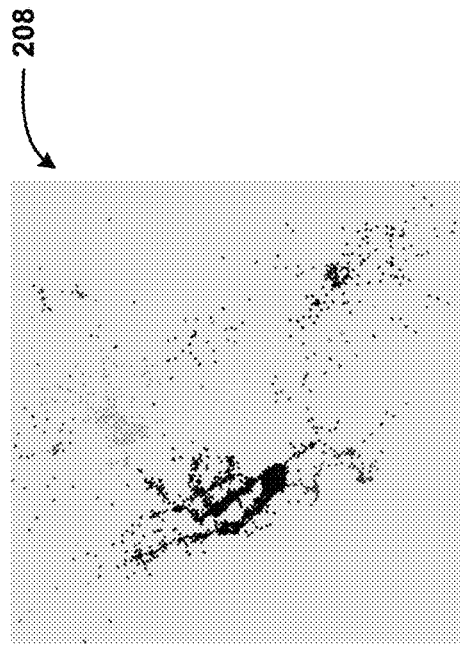
FIG. 2C
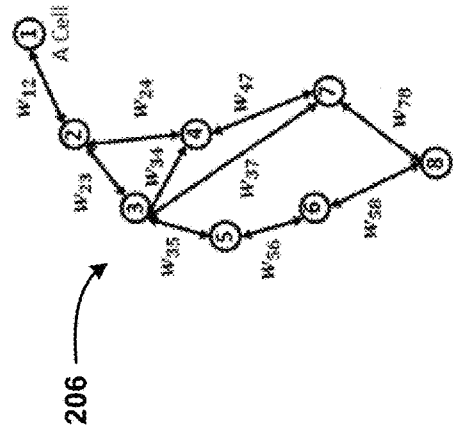
FIG. 2B

CREATING AND USING CELL CLUSTERS

BACKGROUND

In some communication networks, modeling techniques may be used to predict and/or to project demand or performance associated with the communications network. In a cellular network, for example, modeling techniques may be used to predict geographic locations of user equipment ("UE"), quality of service ("QoS"), reference signal receive power ("RSRP"), or other metrics that may reflect usage and/or performance of the cellular network. With the continuing advances in technology and the continued proliferation of network-enabled devices, the complexity of such modeling techniques may increase in the future.

In some instances, modeling techniques may be used to generate models of each base station or cell in a cellular network. Models may also be generated for each UE in a cellular network. These models (users and equipment) may then be used to attempt to project demand and/or movements. Thus, a large number of models may need to be created to accurately model behavior of a cellular network and/or users of the cellular network. Creating such models may require a large amount of computational resources and time.

As communications networks grow in capacity, scale, and/or use; these and/or other models may need to be updated and/or modified. In particular, modern networking approaches and flexibility may result in the models needing to be updated frequently. Such modifications may consume a large amount of time and resources. Still further, even updated models of large-scale and complex networks may require a high number of predictions and/or estimations to model the environments. Such computations may be cost-prohibitive in terms of computations and/or time.

SUMMARY

The present disclosure is directed to creating and using cell clusters. The concepts and technologies disclosed herein can be used to enable implementing scalable models in large and complex networks such as, for example, LTE networks, 5G networks, and/or other evolving and/or future networks. In particular, according to embodiments of the concepts and technologies disclosed herein, models can be trained, built, used, and maintained for clusters of networking equipment (e.g., base stations and/or cells in cellular networks, other equipment, or the like) instead of the models being trained to a specific instance of equipment or other entities. Furthermore, inputs to the clusters of network equipment may also be clustered and used for modeling. Thus, the number of computations and/or estimations required to model the network can be reduced by clustering the equipment and/or cells, as well as clustering the inputs to the equipment and/or cells.

In one example embodiment, a computing device can host and/or can execute a clustering engine that can be configured to generate one or more cell clusters that can represent clusters of one or more cells of the cellular network. The clustering engine can obtain, from the cellular network and/or from one or more cellular network data sources that can be external to and/or internal to the cellular network, one or more instances of cellular network data. The cellular network data can include configuration data such as configuration parameters, geolocation data, and/or other configuration data; event data such as data that indicates requests, alerts, and/or other events; performance data such as key performance indicators ("KPIs"), quality of service, quality of signal, operating and/or performance statistics and/or other performance data; environmental data such as weather information, geographic location information, topology information, and the like; input data such as detected input and/or requested transactions, or the like; and/or other data.

The clustering engine can be configured to analyze the cellular network data to determine how many cell clusters to generate. In some embodiments, the clustering engine can apply an elbow method or other algorithm or process to determine the number of cell clusters to generate and/or to select the parameters, values, type and/or category of the cellular network data that is to be used for the clustering operation. The clustering engine can apply one or more clustering operations, methods, and/or techniques to the cellular network data to create the cell clusters. In some embodiments, the clustering engine can apply a spectral clustering operation, a K-means clustering operation, a hierarchal clustering operation, and/or other clustering algorithms and/or processes to the cellular network data to create the cell clusters. The clustering engine also can be configured to train and/or otherwise create a model associated with each cell cluster. The models can model behavior of the cells included in the respective cell cluster and can be used for various purposes as illustrated and described herein.

The clustering engine also can be configured to analyze the input data to generate one or more input clusters. In particular, the clustering engine can be configured to identify inputs associated with the cell clusters, and to group the inputs into one or more input clusters. In various embodiments, the input clusters can represent various types of input that are received by the cells and/or other entities on the cellular network, as grouped into the input clusters. The clustering engine can be configured to provide a value selected from an input cluster to a model associated with a cell cluster to generate predicted output for that cell cluster and that input cluster.

It can be appreciated that by providing the input clusters to the models associated with the cell clusters, some embodiments of the clustering engine can model behavior of a cellular network and/or one or more components thereof. In some embodiments, the clustering engine can model the cellular network and/or components thereof over many iterations until some or even all input clusters have been operated on by some or even all of the models associated with the cell clusters. In some embodiments, the clustering engine can generate predicted output for a cell cluster over various types of input represented by the various input clusters. In some other embodiments, the clustering engine can generate predicted output for an input cluster over various types of cells represented by the various cell clusters. In yet other embodiments, the clustering engine can generate predicted output for the cellular network in general over the various types of inputs represented by the input clusters over the various types of cells represented by the cell clusters.

In some embodiments, the predicted output can be requested by a user or other entity (e.g., a user of the user device or other device) via a request such as the predicted output request. The clustering engine can be configured to generate the predicted output and to provide (or to trigger other devices and/or entities to provide) the predicted output to the requestor (e.g., the user device). The computing device therefore can operate in some embodiments as a callable or requestable service or application, though this is not necessarily the case. In some other embodiments, the functionality of the clustering engine can be requested by other entities and/or devices (e.g., an operator, device, or other entity associated with the cellular network, an operations entity, a maintenance entity, or the like). In some embodiments, the clustering engine can be configured to generate one or more commands (e.g., via a portal or application programming interface ("API")) to effect a modification to the cellular network (e.g., to modify an operation of one or more components of the cellular network). The cellular network can be configured to modify its operation based on the received command.

According to one aspect of the concepts and technologies disclosed herein, a system is disclosed. The system can include a processor and a memory. The memory can store computer-executable instructions that, when executed by the processor, cause the processor to perform operations. The operations can include obtaining cellular network data that can be associated with a cellular network, the cellular network data including configuration data that can be associated with a cell of the cellular network and a performance indicator that can be associated with the cellular network. The operations further can include determining, based on the cellular network data, a number of cell clusters to be generated, generating, based on the cellular network data, the number of cell clusters, the number of cell clusters including a cell cluster that represents two or more cells including the cell, training a model that represents the cell cluster, and generating, based on the cellular network data, an input cluster that represents two or more inputs. The two or more inputs can be associated with the two or more cells, and the two or more inputs can include a value. The operations further can include providing the value as input to the model to obtain a predicted output associated with the cell cluster.

In some embodiments, the computer-executable instructions, when executed by the processor, can cause the processor to perform operations that further can include determining, based on the predicted output, that an operation of the cell is to be modified; generating a command that, when received by a device associated with the cell, can cause the device to modify the operation of the cell; and triggering delivery of the command to the device. In some embodiments, generating the cell cluster can include clustering the two or more cells based on the configuration data. In some embodiments, generating the input cluster can include clustering the two or more inputs associated with the two or more cells. In some embodiments, the value can include an average input value associated with the two or more inputs. In some embodiments, the model can include a neural network. The neural network can be trained on cellular network data that can be associated with cells in the cell cluster.

According to another aspect of the concepts and technologies disclosed herein, a method is disclosed. The method can include obtaining, at a computing device that can include a processor, cellular network data associated with a cellular network. The cellular network data can include configuration data that can be associated with a cell of the cellular network and a performance indicator that can be associated with the cellular network. The method further can include determining, by the processor and based on the cellular network data, a number of cell clusters to be generated; generating, by the processor and based on the cellular network data, the number of cell clusters, the number of cell clusters including a cell cluster that represents two or more cells including the cell; training, by the processor, a model that represents the cell cluster; and generating, by the processor and based on the cellular network data, an input cluster that represents two or more inputs. The two or more inputs can be associated with the two or more cells, and the two or more inputs can include a value. The method also can include providing, by the processor, the value as input to the model to obtain a predicted output associated with the cell cluster.

In some embodiments, the method further can include determining, based on the predicted output, that an operation of the cell is to be modified; generating a command that, when received by a device associated with the cell, can cause the device to modify the operation of the cell; and triggering delivery of the command to the device. In some embodiments, generating the cell cluster can include clustering the two or more cells based on the configuration data. In some embodiments, generating the input cluster can include clustering the two or more inputs associated with the two or more cells. In some embodiments, the value can include an average input value associated with the two or more inputs. In some embodiments, the model can include a neural network. In some embodiments, the neural network can be trained on cellular network data that is associated with cells in the cell cluster.

According to yet another aspect of the concepts and technologies disclosed herein, a computer storage medium is disclosed. The computer storage medium can store computer-executable instructions that, when executed by a processor, cause the processor to perform operations. The operations can include obtaining cellular network data associated with a cellular network. The cellular network data can include configuration data that can be associated with a cell of the cellular network and a performance indicator that can be associated with the cellular network. The operations further can include determining, based on the cellular network data, a number of cell clusters to be generated; and generating, based on the cellular network data, the number of cell clusters. The number of cell clusters can include a cell cluster that can represent two or more cells including the cell. The operations further can include training a model that represents the cell cluster; and generating, based on the cellular network data, an input cluster that can represent two or more inputs. The two or more inputs can be associated with the two or more cells, and the two or more inputs can include a value. The operations further can include providing the value as input to the model to obtain a predicted output associated with the cell cluster.

In some embodiments, the computer-executable instructions, when executed by the processor, can cause the processor to perform operations that further can include determining, based on the predicted output, that an operation of the cell is to be modified; generating a command that, when received by a device associated with the cell, causes the device to modify the operation of the cell; and triggering delivery of the command to the device. In some embodiments, generating the cell cluster can include clustering the two or more cells based on the configuration data. In some embodiments, generating the input cluster can include clustering the two or more inputs associated with the two or more cells. In some embodiments, the value can include an average input value associated with the two or more inputs. In some embodiments, the model can include a neural network. In some embodiments, the neural network can be trained on cellular network data that is associated with cells in the cell cluster.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

BRIEF DESCRIPTION OF THE DRAWINGS

FIG. 2A is a line drawing that illustrates an example instance of cellular network data, according to an illustrative embodiment of the concepts and technologies disclosed herein.

FIG. 2B is a line drawing that illustrates an example graph constructed for spectral clustering using cellular network data, according to an illustrative embodiment of the concepts and technologies disclosed herein.

FIG. 2C is a drawing that illustrates an example cell clustering generated using spectral clustering using cellular network data, according to an illustrative embodiment of the concepts and technologies disclosed herein.

DETAILED DESCRIPTION

Figure 1:
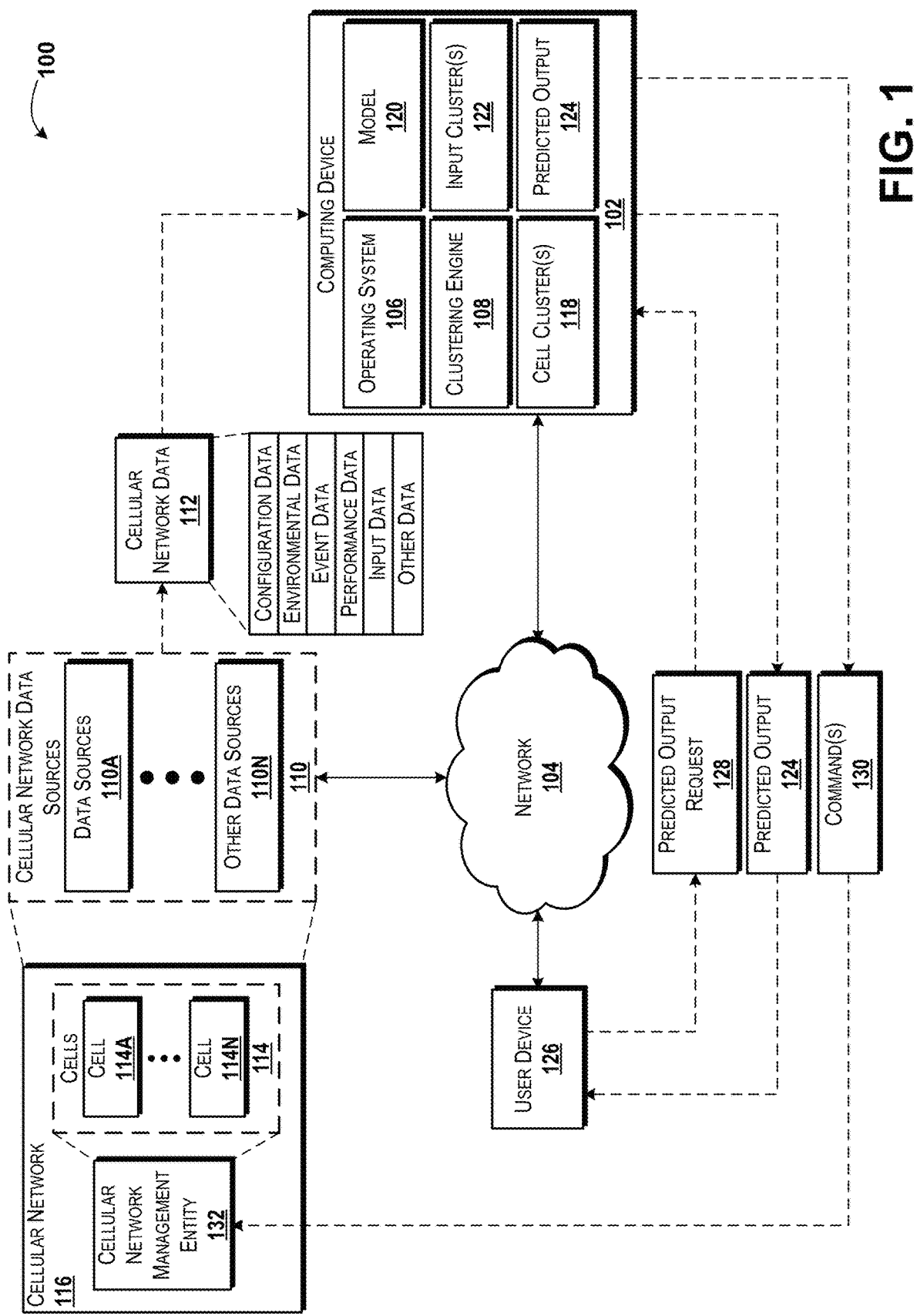
FIG. 1 is a system diagram illustrating an illustrative operating environment for various embodiments of the concepts and technologies described herein.

The following detailed description is directed to creating and using cell clusters. Instead of generating or using a model of each cell of a cellular network, some embodiments of the concepts and technologies disclosed herein can include generating a model for one or more clusters of cells associated with the cellular network. A computing device can host and/or can execute a clustering engine that can be configured to generate one or more cell clusters that can represent clusters of one or more cells of the cellular network. The clustering engine can obtain, from the cellular network and/or from one or more cellular network data sources that can be external to and/or internal to the cellular network, one or more instances of cellular network data. The cellular network data can include configuration data such as configuration parameters, geolocation data, and/or other configuration data; event data such as data that indicates requests, alerts, and/or other events; performance data such as key performance indicators ("KPIs"), quality of service, quality of signal, operating and/or performance statistics and/or other performance data; environmental data such as weather information, geographic location information, topology information, and the like; input data such as detected input and/or requested transactions, or the like; and/or other data.

The clustering engine can be configured to analyze the cellular network data to determine how many cell clusters to generate. In some embodiments, the clustering engine can apply an elbow method or other algorithm or process to determine the number of cell clusters to generate and/or to select the parameters, values, and/or data type (of the cellular network data) to use for the clustering operation. The clustering engine can apply one or more clustering operations, methods, and/or techniques to the cellular network data to create the cell clusters. In some embodiments, the clustering engine can apply a spectral clustering operation, a K-means clustering operation, a hierarchal clustering operation, and/or other clustering algorithms and/or processes to the cellular network data to create the cell clusters. The clustering engine also can be configured to train and/or otherwise create a model associated with each cell cluster. The models can model behavior of the cells included in the respective cell cluster and can be used for various purposes as illustrated and described herein.

The clustering engine also can be configured to analyze the input data to generate one or more input clusters. In particular, the clustering engine can be configured to identify inputs associated with the cell clusters, and to group the inputs into one or more input clusters. In various embodiments, the input clusters can represent various types of input that are received by the cells and/or other entities on the cellular network, as grouped into the input clusters. The clustering engine can be configured to provide a value selected from an input cluster to a model associated with a cell cluster to generate predicted output for that cell cluster and that input cluster.

It can be appreciated that by providing the input clusters to the models associated with the cell clusters, some embodiments of the clustering engine can model behavior of a cellular network and/or one or more components thereof. In some embodiments, the clustering engine can model the cellular network and/or components thereof over many iterations until some or even all input clusters have been operated on by some or even all of the models associated with the cell clusters. In some embodiments, the clustering engine can generate predicted output for a cell cluster over various types of input represented by the various input clusters. In some other embodiments, the clustering engine can generate predicted output for an input cluster over various types of cells represented by the various cell clusters. In yet other embodiments, the clustering engine can generate predicted output for the cellular network in general over the various types of inputs represented by the input clusters over the various types of cells represented by the cell clusters.

In some embodiments, the predicted output can be requested by a user or other entity (e.g., a user of the user device or other device) via a request such as the predicted output request. The clustering engine can be configured to generate the predicted output and to provide (or to trigger other devices and/or entities to provide) the predicted output to the requestor (e.g., the user device). The computing device therefore can operate in some embodiments as a callable or requestable service or application, though this is not necessarily the case. In some other embodiments, the functionality of the clustering engine can be requested by other entities and/or devices (e.g., an operator, device, or other entity associated with the cellular network, an operations entity, a maintenance entity, or the like). In some embodiments, the clustering engine can be configured to generate one or more commands (e.g., via a portal or application programming interface ("API")) to effect a modification to the cellular network (e.g., to modify an operation of one or more component of the cellular network). The cellular network can be configured to modify its operation based on the received command.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating and using cell clusters will be described, according to an illustrative embodiment. The operating environment 100 shown in FIG. 1 includes a computing device 102. The computing device 102 can operate in communication with and/or as a part of a communications network ("network") 104, though this is not necessarily the case.

According to various embodiments, the functionality of the computing device 102 may be provided by one or more server computers, desktop computers, laptop computers or other portable computing devices, other computing systems, and the like. It should be understood that the functionality of the computing device 102 can be provided by a single device, by two or more similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, a clustering engine 108. The operating system 106 can include a computer program for controlling the operation of the computing device 102. The clustering engine 108 can include an executable program that can be configured to execute on top of the operating system 106 to provide various functions as illustrated and described herein. Although the clustering engine 108 is illustrated as being hosted and/or executed by the computing device 102, it should be understood that the clustering engine 108 may be embodied as or in one or more stand-alone device(s) or component(s) thereof operating as part of or in communication with the network 104 and/or the computing device 102. As such, the illustrated embodiment should be understood as being illustrative of only some contemplated embodiments and should not be construed as being limiting in any way.

The clustering engine 108 can be configured to obtain information from one or more cellular network data sources 110A-N (hereinafter collectively and/or generically referred to as "cellular network data sources 110"). In various embodiments of the concepts and technologies disclosed herein, the information obtained from the cellular network data sources 110 can include and/or can correspond to cellular network data 112. According to various embodiments of the concepts and technologies disclosed herein, the cellular network data sources 110 can include various data sources such as, for example, databases and/or data structures (e.g., a database associated with one or more cells 114A-N (hereinafter collectively and/or generically referred to as "cells 114") of a cellular network 116); monitoring, control, and/or reporting devices and/or mechanisms associated with the cellular network 116; location servers and/or other sources of geolocation information; weather data sources, internal and/or external data sources associated with the cellular network 116 and/or components thereof; network usage and/or performance data sources; and/or other data sources.

The cellular network data sources 110 also can include reporting and/or event sources that can report events and/or event data. One or more of the cellular network data sources 110 also can be configured to track input for the cellular network 116 and/or one or more components thereof. Because the cellular network data 112 can be obtained from additional and/or alternative cellular network data sources 110, it should be understood that the above examples are illustrative and therefore should not be construed as being limiting in any way.

As illustrated in FIG. 1, and as can be appreciated with reference to the various contemplated cellular network data sources 110, the cellular network data 112 can include, for example, configuration data, environmental data, event data, performance data, input data, and/or other data. According to various embodiments of the concepts and technologies disclosed herein, the cellular network data 112 can include configuration parameters. The configuration parameters can include static configuration parameters and/or dynamic configuration parameters.

In some embodiments, the configuration parameters can include, for example, numerical and categorical parameters including, but not limited to, frequency and/or frequencies used by a particular cell 114, height of an antenna and/or other hardware associated with a particular cell 114, azimuth associated with a particular cell 114 and/or one or more components thereof, gain associated with a particular cell 114 and/or one or more components thereof, beam-width associated with a particular cell 114 and/or one or more components thereof, mechanical and/or electrical tilts associated with a particular cell 114 and/or one or more components thereof, cell-radius associated with a particular cell 114, a number of antennas associated with a particular cell 114, a propagation model associated with a particular cell 114 and/or one or more components thereof, combinations thereof, or the like.

The cellular network data 112 also can include data from other sources such as databases, data structures, and/or other data sources. According to various contemplated embodiments, the databases and/or other data sources can store data that can indicate the geographic location and/or position of one or more cells 114 and/or one or more components thereof, computation and/or storage capacities of servers associated with a particular cell 114 and/or one or more components thereof, cell-loads associated with a particular cell 114 and/or one or more components thereof, and/or information from external sources such as ZIP codes associated with a particular cell 114, weather associated with a particular cell 114, and/or other information associated with a particular cell 114 and/or one or more components thereof.

The cellular network data 112 also can include, but is not limited to, event data. Event data can include data that can reflect one or more events associated with one or more of the cells 114 and/or one or more components thereof. The events can include, for example, failures, repairs, requests, responses, combinations thereof, or the like. The cellular network data 112 also can include, but is not limited to, environmental data associated with one or more of the cells 114. For example, the environmental data can represent weather at or near one or more of the cells 114 and/or one or more components thereof, operating conditions at or near one or more of the cells 114 and/or one or more components thereof, noise floor and/or noise thresholds at or near one or more of the cells 114 and/or one or more components thereof, other ambient operating conditions at or near one or more of the cells 114 and/or one or more components thereof, combinations thereof, or the like.

The cellular network data 112 also can include performance data associated with one or more of the cells 114 and/or one or more component thereof. The performance data can represent, for example, one or more performance characteristics associated with one or more of the cells 114 such as, for example, transmission power, perceived or measured received signal power, perceived or measured received signal quality ("RSQ"), or other KPIs such as bandwidth associated with the cell 114 and/or one or more components thereof, capacity associated with the cell 114 and/or one or more components thereof, uplink and/or downlink speed associated with the cell 114 and/or one or more components thereof, jitter associated with the cell 114 and/or one or more components thereof, delay associated with the cell 114 and/or one or more components thereof, combinations thereof, or the like. According to various embodiments of the concepts and technologies disclosed herein, the event data can include stored values and/or streamed data (e.g., realtime and/or near-realtime events that can stream from network elements to the computing device 102). It should be understood that these examples are illustrative, and therefore should not be construed as being limiting in any way.

According to various embodiments of the concepts and technologies disclosed herein, the cellular network data 112 also can include input data. In some embodiments, the input data can be provided separate from the cellular network data 112, so the illustrated embodiment should be understood as being illustrative and should not be construed as being limiting in any way. The input data can represent inputs associated with one or more of the cells 114 and/or one or more components thereof. The input data can represent input that is provided to one or more of the cells 114 and/or one or more components thereof. Thus, the input data can be used to understand a type of interaction that occurs with respect to a particular cell 114, a type of information provided to, requested, and/or obtained from a particular cell 114, a frequency of particular types of input and/or requests, other input, combinations thereof, or the like. Because the input data can reflect any data that is provided to the cells 114 and/or components thereof, it should be understood that the above examples are illustrative and therefore should not be construed as being limiting in any way. The cellular network data 112 also can include other data, which can include various types of data associated with the cellular network 116.

An example embodiment of cellular network data 112 is illustrated in FIG. 2A. It should be understood that this example is illustrative and is provided only for purposes of explaining some aspects of the cellular network data 112 in one example embodiment. In FIG. 2A, an instance of cellular network data 112 is illustrated as a table 200. The table 200 can include n rows 202A-N (hereinafter collectively and/or generically referred to as "rows 202") and m columns 204A-M (hereinafter collectively and/or generically referred to as "columns 204"). As shown in FIG. 2A, the example table 200 includes n rows, each having m columns. Therefore, the number of data points reflected in the table 200 can correspond to n×m data points.

In the example embodiment shown in FIG. 2A, the table can include a first row 202A, which can correspond to a set of data points for a first cell $CELL_1$. As can be appreciated with reference to FIG. 2A, data points for the first cell $CELL_1$ can include data points for configuration data, environmental data, event data, performance data, input data, other data types and/or data points, and other data. It should be understood that a particular row and/or other instance of cellular network data 112 can include multiple data points for any particular category of information (e.g., in some instances multiple data points for configuration data, environmental data, event data, performance data, input data, other data, and/or other data points can be included). Similarly, it should be understood that multiple rows 202 may exist in a particular instance of the cellular network data 112 for a particular cell 114, in some embodiments. As such, the illustrated embodiment is illustrative and should not be construed as being limiting in any way.

As will be explained in more detail below, the cells 114 represented by the cellular network data 112 can be grouped into the cell clusters 118. Any type of data included in the cellular network data 112 may be used to group the cells 114 into the cell clusters 118. For example, in some embodiments the environmental data may be used to group the cells 114 into the cell clusters 118, while in some other embodiments the geographic location, event data, performance data, or other data may be used to group the cells 114 into the cell clusters 118. Because the cell clusters 118 can be created based on any information included in the cellular network data 112, it should be understood that the above examples are illustrative, and therefore should not be construed as being limiting in any way.

According to various embodiments of the concepts and technologies disclosed herein, the clustering engine 108 can be configured to obtain one or more instances of the cellular network data 112 for one or more cells 114 of the cellular network 116. The clustering engine 108 can be used to create one or more clusters of the cells 114, referred to hereinafter as cell clusters 118. Thus, it can be appreciated that the cell clusters 118 can correspond in some embodiments to logical groupings of one or more cells 114 and/or data associated with the one or more cells 114. It should be understood that this example is illustrative, and therefore should not be construed as being limiting in any way.

According to various embodiments of the concepts and technologies disclosed herein, the clustering engine 108 can be configured to process the cellular network data 112. In some embodiments, for example, the clustering engine 108 can be configured to convert categorical variables to numerical objects. In some embodiments, the clustering engine 108 can be configured to address missing and/or "not a number" ("NaN") values. Thus, the clustering engine 108 can be configured to standardize the data points included in the cellular network data 112, in some embodiments. In some embodiments, the clustering engine 108 can be configured to weight one or more data points included in an instance of cellular network data 112 (e.g., based on relative importance of the data points included in the cellular network data 112).

The weighting can be based on settings, preferences, and/or determined relative importance, in various embodiments of the concepts and technologies disclosed herein. The clustering engine 108 also can be configured to transport inputs represented by the cellular network data 112 (e.g., by applying principle components analysis on one or more sub-sets of data points). This processing can be referred to herein as "pre-processing" as this processing can occur before the clustering of the cells 114 as illustrated and described hereinbelow. Because additional, alternative, and/or no processing operations may be performed on the cellular network data 112, it should be understood that the above examples are illustrative, and therefore should not be construed as being limiting in any way.

In some embodiments, the clustering engine 108 can be configured to determine a number of cell clusters 118 are to be generated based on an analysis and/or other operations. This determination can also explicitly and/or implicitly identify what parameters, values, type of data, category of data, and/or other portions of the cellular network data 112 may be used to generate the cell clusters 118. In some embodiments, the clustering engine 108 can be configured to apply an elbow method or other method to the cellular network data 112 to determine how many cell clusters 118 to generate based on the cellular network data 112 and/or to determine what parameters and/or values of the cellular network data 112 are to be used for the clustering operation.

In some embodiments, the determination of the number of cell clusters 118 that are to be generated can be based on identifying variances in data associated with two or more clusters of the cells 114. In particular, the clustering engine 108 can be configured, in some embodiments, to analyze the cellular network data 112 and the number of cell clusters 118 can be based on identifying a number of cell clusters 118 at which the variances between the data in the cell clusters 118 does not justify adding another cell cluster 118. Thus, the number of cell clusters 118 can be determined as an optimal number of cell clusters 118 in some embodiments. For example, the elbow method mentioned above can enable identification of an optimal number of cell clusters 118 in some embodiments. Of course, other methods and/or techniques can be used to determine a number of cell clusters 118 to generate, so this example should not be construed as being limiting in any way.

The clustering engine 108 also can be configured to create the cell clusters 118 in accordance with the determined number of cell clusters 118 and in accordance with the identified parameters, values, and/or other portions of the cellular network data 112. According to various embodiments of the concepts and technologies disclosed herein, the cell clusters 118 can correspond to clusters of data included in the cellular network data 112. Thus, for example, the clustering engine 108 can be configured to group the cellular network data 112 into the cell clusters 118 based on an associated grouping of the cells 114. For example, if four cells are clustered into two cell clusters 118 (e.g., cell$_1$ and cell$_2$ in cell cluster$_1$ and cell$_3$ and cell$_4$ in cell cluster$_2$), the clustering engine 108 can be configured to group cellular network data 112 associated with cell$_1$ and cell$_2$ in cell cluster$_1$ and to group cellular network data 112 associated with cell$_3$ and cell$_4$ in cell cluster$_2$. It should be understood that this example is illustrative, and therefore should not be construed as being limiting in any way.

According to various embodiments of the concepts and technologies disclosed herein, the clustering engine 108 can be configured to train and/or otherwise create one or more models 120 for each of the cell clusters 118 and not for each cell 114 included in the cell clusters 118. The models 120 can include one or more artificial intelligence models and/or machine learning models, and therefore the models 120 illustrated and described herein can include one or more artificial intelligence models, one or more machine learning models (e.g., neural networks, deep neural networks, reinforcement learning models, combinations thereof, or the like), combinations thereof, or the like. In some embodiments, the models 120 can be trained to depict or represent behavior of a cell cluster 118 (e.g., the models 120 can be used to project or predict an average or expected behavior of the cells 114 included in the cell cluster 118). For example, the models 120 can be configured to depict or represent behavior of one or more of the cells 114 associated with the cellular network data 112 in each of the cell clusters 118. It should be understood that this example is illustrative, and therefore should not be construed as being limiting in any way.

According to various implementations of the concepts and technologies disclosed herein, the clustering engine 108 can be configured to create the cell clusters 118 using a clustering process, algorithm, and/or technique. According to various embodiments of the concepts and technologies disclosed herein, the clustering engine 108 can apply machine learning such as, for example, a spectral clustering operation, a K-means clustering operation, a hierarchal clustering operation, and/or other clustering algorithms and/or processes to the cellular network data 112 to determine what parameters to use for the clustering and/or to generate the cell clusters 118. In particular, an artificial intelligence or machine learning model can be trained and/or built for the cell clusters 118. In one example embodiment, a graph can be constructed by connecting each cell 114 to its neighboring cell(s) 114. An example graph that can be constructed in accordance with the concepts and technologies disclosed herein is illustrated in FIG. 2B. It should be understood that this example is illustrative, and therefore should not be construed as being limiting in any way.

According to various embodiments, edge weights can be computed based on one or more of a) a distance ($d_{ij}$) between the neighboring cells 114, b) similarity of numerical values of the two cells 114 ($V_i^n$ and $V_j^n$, where each vector can have multiple numerical components for each cell 114 such as frequency, height, azimuth, etc.), and c) identicality of propagation models for two cells ($PM_i$ and $PM_j$). For example, if a distance of ten km is used, an edge weight between cells i and j can be computed as:

$$W_{ij} = \frac{1}{3}\frac{d_{ij}}{d_0}(1 - \text{sign}(d_{ij} - d_0)) + \frac{1}{3}\frac{\langle V_i^n, V_j^n \rangle}{\|V_i^n\|\|V_j^n\|} + \frac{1}{3}\delta(PM_i - PM_j)$$

Because the clustering engine can use additional and/or alternative types of clustering approaches to determine what parameters to use to generate the cell clusters 118 and/or to generate the cell clusters 118, it should be understood that the above-illustrated and described example is illustrative and should not be construed as being limiting in any way.

According to various embodiments of the concepts and technologies disclosed herein, the parameters (e.g., the type or category of values and/or indicators chosen from the cellular network data 112) that are chosen to be used for the clustering of the cells 114 into the cell clusters 118 can be chosen according to various preferences and/or settings. In some embodiments, the parameters are chosen based on their having a greatest direct effect on signal strength and/or signal quality for a cell 114. For example, some embodiments of the concepts and technologies disclosed herein use parameters relating to a frequency and/or frequencies used by a particular cell 114, a height of an antenna and/or cell site associated with a particular cell 114, an azimuth associated with a particular cell 114, a gain associated with a particular cell 114, a beam-width associated with a particular cell 114, mechanical and/or electrical tilts associated with a particular cell 114, a cell-radius associated with a particular cell 114, a number of antennas associated with a particular cell 114, and/or a propagation model associated with a particular cell 114 for the clustering operation.

Additionally, as noted above, embodiments of the concepts and technologies disclosed herein can be used to construct a graph and/or to determine edge weights (as noted above) to identify the most relevant parameters for use in the clustering operation (e.g., a spectral clustering operation). Thus, embodiments of the concepts and technologies disclosed herein can use two levels of clustering, e.g., one level for determining the number of cell clusters and/or the parameters to use for the clustering of the cells 114, and a second level to actually generate the cell clusters 118. Embodiments of the concepts and technologies disclosed herein therefore can be used to reduce the number of artificial intelligence and/or machine learning models that will be generated, and to reduce a number of required predictions and/or estimations for using those models. It should be understood that this example is illustrative, and therefore should not be construed as being limiting in any way.

The clustering engine 108 therefore can be configured to analyze the cellular network data 112 to identify and/or determine a number of cell clusters 118, assign the cellular network data 112 to an identified and/or determined number of cell clusters 118, and create the model 120 associated with each of the cell clusters 118. In some embodiments, the model 120 can include and/or can correspond to a neural network, for example a neural network that has been trained on the data associated with the cell cluster 118. An example clustering of nodes in one example embodiment is shown in FIG. 2C. It should be understood that this example is illustrative, and therefore should not be construed as being limiting in any way.

In some embodiments of the concepts and technologies disclosed herein, the clustering engine 108 can be configured to process the data associated with the cell clusters 118 after clustering. In particular, the clustering engine 108 can be configured to split one cell cluster 118 into two or more sub-clusters based on various considerations (e.g., based on computation and/or storage resources needed to build a model 120 associated with the cell cluster 118, data storage considerations, combinations thereof, or the like). In some embodiments, this processing can be referred to as "post-processing" as the processing can occur after clustering. It should be understood that this example is illustrative, and therefore should not be construed as being limiting in any way.

After training and/or generating the models 120 associated with the cell clusters 118 (e.g., one or more graphs associated with the cell clusters 118), the clustering engine 108 can use the models 120 for various operations as illustrated and described herein. In particular, some embodiments of the concepts and technologies disclosed herein entail providing actual, expected, and/or simulated input to the cell clusters 118 to predict or model output associated with the cell clusters 118. In some embodiments, the clustering engine 108 can create one or more input clusters 122 and provide one or more of the input clusters 122 to one or more of the cell clusters 118 to project or predict output.

In some embodiments of the concepts and technologies disclosed herein, the inputs can be clustered into input clusters 122 based on the corresponding cell clusters 118. In particular, input data from data associated with a particular cell cluster 118 can be clustered into an input cluster 122, in some embodiments. It should be understood that this example is illustrative, and therefore should not be construed as being limiting in any way.

In some embodiments, inputs and/or measurements reflected by the input data may correspond to a small geographic area and/or otherwise may be similar and may have undistinguishable structure and/or signatures. In particular, input data for a particular area may result in a prediction and/or estimation made by the model 120 that can be approximately the same for all inputs associated with an input cluster 122. Thus, embodiments of the concepts and technologies disclosed herein can group the inputs into the input clusters 122 to reduce the number of required predictions and/or estimations, thereby reducing a burden on computation and/or storage resources.

It should be understood that this example is illustrative, and therefore should not be construed as being limiting in any way. By way of example, position estimation and throughput and/or quality of service prediction in a cellular network may be similar for a serving cell and a neighbor cell. Specifically, an RSRP, a reference signal received quality ("RSRQ"), and/or TA of devices in a small area may be similar for a cell and a neighboring cell. Thus, using one data point selected from the input cluster 122 (e.g., a mean, average, centroid, or other selected data point) may result in similar predictions and/or estimations. In some other embodiments, a function of values (e.g., a function of a mean, average, centroid, or other selected data point or value, a function of two or more data points or values, or a function of other data points or values included in the input cluster) and/or data from an input cluster 122 can be used to represent the data in the input cluster 122. Thus, it should be understood that one data point or a function of values can be used as data from the input cluster 122 to model input for a cell cluster 118. It should be understood that this example is illustrative, and therefore should not be construed as being limiting in any way.

In particular, the clustering engine 108 can be configured to analyze input associated with the cellular network 116 (e.g., input data as illustrated and described herein) and to generate one or more input clusters 122 based on the input data. In some embodiments, the generation of the input clusters 122 by the clustering engine 108 can be similar to a manner used by the clustering engine 108 to generate the cell clusters 118, though this is not necessarily the case. In some other embodiments, the clustering engine 108 can be configured to group the inputs associated with a cell cluster 118 into an input cluster 122. It should be understood that this example is illustrative, and therefore should not be construed as being limiting in any way.

According to various embodiments of the concepts and technologies disclosed herein, the use of input clusters 122 can be used to reduce the number of requested predictions and/or estimations to be generated by the models 120. Namely, instead of modeling output (e.g., generating the predicted output 124) for each input, embodiments of the concepts and technologies disclosed herein can generate predicted output 124 for a value (e.g., a mean value, an average value, a centroid value, etc.) that can be selected from an input cluster 122 that can represent two or more inputs, thereby reducing computations and/or predictions by the models 120. It should be understood that this example is illustrative, and therefore should not be construed as being limiting in any way.

According to various embodiments of the concepts and technologies disclosed herein, the clustering engine 108 can be configured to provide one or more input clusters 122 as input to one or more models 120 associated with one or more cell cluster 118. A particular model 120 can be configured to operate on the value selected from the input cluster 122, and output from the model 120 can correspond to predicted output 124 for the associated cell cluster 118. By operating on the input clusters 122 using the cell clusters 118, predicted output 124 for one or more cells 114 in a cell cluster 118 can be generated and can be used for various purposes. By iterating this process (e.g., by providing all input clusters 122 to each of the models 120), the operation of the cellular network 116 can be predicted. Alternatively, specific cells 114 and/or cell clusters 118 can be analyzed by providing input clusters 122 to one or more models 120. Thus, it can be appreciated that the models 120 can be used to generate predicted output 124 for one or more cell clusters 118 and/or one or more input clusters 122 in various embodiments. It should be understood that this example is illustrative, and therefore should not be construed as being limiting in any way.

In some embodiments, a user device 126 and/or other computing device can be used to create a request for the predicted output 124. This request, labeled in FIG. 1 as the predicted output request 128, can request that the clustering engine 108 predict behavior of the cellular network 116 and/or one or more cells 114 of the cellular network 116. The predicted output 124 can be used for various reasons and/or purposes. For example, the user device 126 can request the predicted output 124 for analysis and/or viewing, and therefore the user device 126 may obtain the predicted output 124 in a user interface or other display. It should be understood that this example is illustrative, and therefore should not be construed as being limiting in any way.

In some other embodiments, the user device 126 may request that the operation of the cellular network 116 be modified based on the predicted output 124. Of course, the request to modify the operation of the cellular network 116 may come from any requestor and therefore the user device 126 may or may not be included in all embodiments. The clustering engine 108 and/or other applications, services, and/or entities can be configured to generate one or more commands 130 for modifying an operation of the cellular network 116. In the illustrated embodiment shown in FIG. 1, the clustering engine 108 can be configured to generate the one or more commands 130 and to provide the one or more commands 130 to the cellular network 116 (or a component thereof such as a cellular network management entity 132 and/or a cell 114) for application at the cellular network 116. The cellular network 116 and/or one or more components thereof can apply the commands 130 to change one or more operations of the cellular network 116. It should be understood that this example is illustrative, and therefore should not be construed as being limiting in any way.

In practice, it may be desirable in some cases to create one or more models 120 for one or more clusters of cells 114 of a cellular network 116 instead of generating a model 120 for each cell 114 of the cellular network 116. In one contemplated implementation of the concepts and technologies disclosed herein, a 5G network can include millions of cells 114. As such, the generating of and/or use of a model 120 for each cell 114 may not be scalable. Thus, some embodiments of the concepts and technologies disclosed herein can include generating a model 120 for each of one or more clusters of cells 114, referred to herein as cell clusters 118.

A computing device 102 can host and/or can execute a clustering engine 108 that can be configured to generate one or more cell clusters 118 that can represent clusters of one or more cells 114 of the cellular network 116. The clustering engine 108 can obtain, from the cellular network 116 and/or from one or more cellular network data sources 110 that can be external to and/or internal to the cellular network 116, one or more instances of cellular network data 112. The cellular network data 112 can include configuration data such as configuration parameters, geolocation data, and/or other configuration data; event data such as data that indicates requests, alerts, and/or other events; performance data such as KPIs, quality of service, quality of signal, operating and/or performance statistics and/or other performance data; environmental data such as weather information, geographic location information, topology information, and the like; input data such as detected input and/or requested transactions, or the like; and/or other data.

The clustering engine 108 can be configured to analyze the cellular network data 112 to determine how many cell clusters 118 to generate. In some embodiments, the clustering engine 108 can apply an elbow method or other algorithm or process to determine the number of cell clusters 118 to generate and/or to select the parameters to use for the clustering operation. The clustering engine 108 can apply one or more clustering operations, methods, and/or techniques to the cellular network data 112 to create the cell clusters 118. In some embodiments, the clustering engine 108 can apply a spectral clustering operation, a K-means clustering operation, a hierarchal clustering operation, and/or other clustering algorithms and/or processes to the cellular network data 112 to create the cell clusters 118. The clustering engine 108 also can be configured to train and/or otherwise create a model 120 associated with each cell cluster 118. The models 120 can model behavior of the cells 114 included in the respective cell cluster 118 and can be used for various purposes as illustrated and described herein. It should be understood that this example is illustrative, and therefore should not be construed as being limiting in any way.

The clustering engine 108 also can be configured to analyze the input data to generate one or more input clusters 122. In particular, the clustering engine 108 can apply one or more algorithms and/or processes to the cellular network data 112 to determine how many input clusters 122 to generate. The clustering engine 108 can apply one or more clustering algorithms, processes, and/or methods to the cellular network data 112 to generate the input clusters 122. The input clusters 122 can represent various types of input that are received by the cells 114 and/or other entities on the cellular network 116, as grouped into the input clusters 122. The clustering engine 108 can be configured to provide a value (e.g., a mean value, an average value, a centroid value, etc.) that can be selected from an input cluster 122 to a model 120 associated with a cell cluster 118 to generate predicted output 124 for that cell cluster 118 and that input cluster 122.

It can be appreciated that by providing the input clusters 122 to the models 120 associated with the cell clusters 118, some embodiments of the clustering engine 108 can model behavior of a cellular network 116 and/or one or more components thereof. In some embodiments, the clustering engine 108 can model the cellular network 116 and/or components thereof over many iterations until some or even all input clusters 122 have been operated on by some or even all of the models 120 associated with the cell clusters 118. In some embodiments, the clustering engine 108 can generate predicted output 124 for a cell cluster 118 over various types of input represented by the various input clusters 122.

In some other embodiments, the clustering engine 108 can generate predicted output 124 for a value (e.g., a mean value, an average value, a centroid value, etc.) that can be selected from an input cluster 122 over various types of cells 114 represented by the various cell clusters 118. In yet other embodiments, the clustering engine 108 can generate predicted output 124 for the cellular network 116 in general over the various types of inputs represented by the input clusters 122 over the various types of cells 114 represented by the cell clusters 118. It should be understood that this example is illustrative, and therefore should not be construed as being limiting in any way.

In some embodiments, the predicted output 124 can be requested by a user or other entity (e.g., a user of the user device 126 or other device) via a request such as the predicted output request 128. The clustering engine 108 can be configured to generate the predicted output 124 and to provide (or to trigger other devices and/or entities to provide) the predicted output 124 to the requestor (e.g., the user device 126). The computing device 102 therefore can operate in some embodiments as a callable or requestable service or application, though this is not necessarily the case. In some other embodiments, the functionality of the clustering engine 108 can be requested by other entities and/or devices (e.g., an operator, device, or other entity associated with the cellular network 116, an operations entity, a maintenance entity, or the like). In some embodiments, the clustering engine 108 can be configured to generate one or more commands 130 to effect a modification to the cellular network 116 (e.g., to modify an operation of one or more component of the cellular network 116). The cellular network 116 can be configured to modify its operation based on the received command 130. It should be understood that this example is illustrative, and therefore should not be construed as being limiting in any way.

FIG. 1 illustrates one computing device 102, one network 104, three cellular network data sources 110, one cellular network 116, one user device 126, and one cellular network management entity 132. It should be understood, however, that various implementations of the operating environment 100 can include one or more than one computing device 102; one or more than one network 104; one or more than one cellular network data source 110; one or more than one cellular network 116; zero, one, or more than one user device 126; and/or zero, one, or more than one cellular network management entity 132. As such, the illustrated embodiment should be understood as being illustrative, and should not be construed as being limiting in any way.

Figure 3:
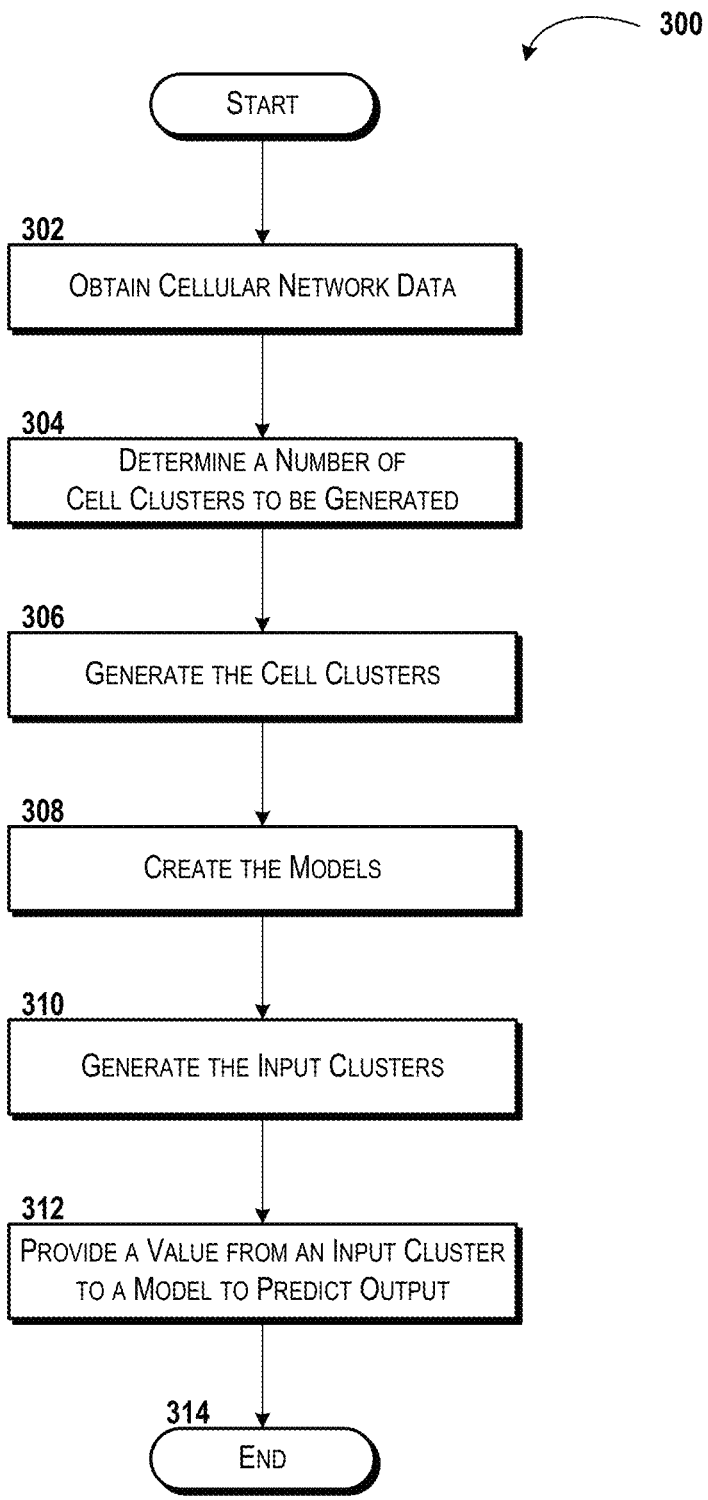
FIG. 3 is a flow diagram showing aspects of a method for creating cell clusters and input clusters, according to an illustrative embodiment of the concepts and technologies described herein.

Turning now to FIG. 3, aspects of a method 300 for creating cell clusters 118 and input clusters 122 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the method 300 is described herein as being performed by the computing device 102 via execution of one or more software modules such as, for example, the clustering engine 108. It should be understood that additional and/or alternative devices and/or network nodes can provide the functionality described herein via execution of one or more modules, applications, and/or other software including, but not limited to, the clustering engine 108. Thus, the illustrated embodiments are illustrative, and should not be viewed as being limiting in any way.

The method 300 can begin at operation 302. At operation 302, the computing device 102 can obtain data associated with a cellular network 116 such as, for example, the cellular network data 112 illustrated and described above with reference to FIG. 1. The cellular network data 112 can include, but is not limited to, configuration parameters such as, for example, numerical and categorical parameters that can represent a frequency and/or frequencies used by a particular cell 114, a height of an antenna and/or cell site associated with a particular cell 114, an azimuth associated with a particular cell 114, a gain associated with a particular cell 114, a beam-width associated with a particular cell 114, mechanical and/or electrical tilts associated with a particular cell 114, a cell-radius associated with a particular cell 114, a number of antennas associated with a particular cell 114, a propagation model associated with a particular cell 114, combinations thereof, or the like.

The cellular network data 112 also can include data from other sources such as databases and/or other data structures that can include, for example, geographic location and/or position associated with one or more of the cells 114, computation and/or storage capacities of servers associated with one or more of the cells 114, cell-loads associated with one or more of the cells 114, and/or information from external sources such as ZIP codes associated with one or more of the cells 114, weather associated with one or more of the cells 114, geographical information associated with one or more of the cells 114, and/or other information associated with one or more of the cells 114.

The cellular network data 112 also can include, but is not limited to, event data that can reflect one or more events associated with one or more of the cells 114 such as failures, repairs, requests, responses, combinations thereof, or the like. The cellular network data 112 also can include, but is not limited to, environmental data associated with one or more of the cells 114. For example, the environmental data can represent weather at or near one or more of the cells 114, operating conditions at or near one or more of the cells 114, noise floor and/or noise thresholds at or near one or more of the cells 114, other ambient operating conditions at or near one or more of the cells 114, combinations thereof, or the like.

The cellular network data 112 also can include performance data associated with one or more of the cells 114. The performance data can represent, for example, one or more performance characteristics associated with one or more of the cells 114 such as, for example, transmission power, perceived or measured RSRP, perceived or measured RSRQ, or other KPIs such as bandwidth, capacity, uplink and/or downlink speed, jitter, delay, combinations thereof, or the like. The cellular network data 112 also can include input data that can represent inputs associated with one or more of the cells 114. The input data can represent input that is provided to one or more of the cells 114. In some embodiments, the input data can represent input provided to the cells 114 of the cellular network 116. It should be understood that this example is illustrative, and therefore should not be construed as being limiting in any way. The cellular network data 112 also can include other data, which can include various types of data associated with the cellular network 116.

According to various embodiments of the concepts and technologies disclosed herein, the cellular network data 112 can be obtained from one or more of the cellular network data sources 110 illustrated and described herein. One or more of the cellular network data sources 110 can be internal to one or more devices of the cellular network 116, external to the one or more device of the cellular network 116, and/or components of one or more devices of the cellular network 116. In some embodiments, one or more portions of the cellular network data 112 can be requested by the computing device 102. In some other embodiments, one or more portions of the cellular network data 112 can be reported to the computing device 102 by the cellular network 116. Regardless of whether the cellular network data 112 is requested by the computing device 102 and/or provided to the computing device 102 without request, the computing device 102 can obtain the cellular network data 112 in operation 302.

Obtaining the cellular network data 112 also can include data processing operations performed by the computing device 102 and/or other devices, applications, and/or other entities. As noted above, the processing operations can include, but are not limited to, converting categorical variables to numerical objects, addressing missing and/or NaN values, weighting one or more data points included in an instance of cellular network data 112, transporting inputs represented by the cellular network data 112, and/or other operations. Because additional and/or alternative processing operations can be performed on the cellular network data 112, it should be understood that these examples are illustrative, and therefore should not be construed as being limiting in any way.

From operation 302, the method 300 can proceed to operation 304. At operation 304, the computing device 102 can determine a number of cell clusters 118 to be generated based on the cellular network data 112 obtained in operation 302. Operation 304 also can include, as part of the determination of the number of cell clusters 118 to generate, the parameters that are to be used to cluster the cells 114. According to various embodiments of the concepts and technologies disclosed herein, the computing device 102 can be configured to apply one or more algorithms, models, processes, or the like to the cellular network data 112 obtained in operation 302 to determine how many cell clusters 118 are to be generated. This determination can be based on parameters and/or values in the cellular network data 112, and therefore can also be a factor in selecting which parameter and/or values are going to be used for the clustering (e.g., whether the clustering will be based on a frequency used by the cell 114, a geographic location of the cell 114, etc.). According to various embodiments of the concepts and technologies disclosed herein, the computing device 102 can apply an elbow technique or other technique to the cellular network data 112 to determine how many cell clusters 118 to generate and/or to select the parameters to use for the clustering operation.

According to various embodiments of the concepts and technologies disclosed herein, the computing device 102 can identify an optimal number of cell clusters 118 in operation 304. Thus, it can be appreciated that identifying the optimal number of cell clusters 118 can correspond to the computing device 102 adding an additional cell cluster 118 until a "return" on adding the additional cell cluster 118 (e.g., in terms of a percentage of variance (among data points) that is represented by the cell clusters 118) no longer justifies adding another cell cluster 118. Of course, the number of cell clusters 118 that is "optimal" may differ based on what parameters and/or values are used. At any rate, because the optimal number of cell clusters 118 can be identified in additional and/or alternative manners, it should be understood that this example is illustrative, and therefore should not be construed as being limiting in any way.

From operation 304, the method 300 can proceed to operation 306. At operation 306, the computing device 102 can generate the number of cell clusters 118 determined in operation 304 based on the parameters and/or values determined in operation 304. According to various embodiments of the concepts and technologies disclosed herein, the computing device 102 can generate the cell clusters 118 by grouping the associated cells 114 (the cells 114 associated with the determined number of cell clusters 118) into the determined number of cell clusters 118. According to various embodiments of the concepts and technologies disclosed herein, the cells 114 can be grouped into the cell clusters 118 based on various types of information included in the cellular network data 112.

According to various embodiments of the concepts and technologies disclosed herein, the computing device 102 can be configured to apply machine learning to the cellular network data 112 to generate the cell clusters 118. In some embodiments, for example, the computing device 102 can apply, for example, a spectral clustering operation to the cellular network data 112 to generate the cell clusters 118. In some other embodiments, the computing device 102 can apply, for example, a K-means clustering operation to the cellular network data 112 to generate the cell clusters 118. In some other embodiments, the computing device 102 can apply, for example, a hierarchal clustering operation to the cellular network data 112 to generate the cell clusters 118. In yet other embodiments, the computing device 102 can apply, for example, other clustering algorithms and/or processes to the cellular network data 112 to create the cell clusters 118. Because the clustering of data can be accomplished using additional and/or alternative operations, it should be understood that the above examples are illustrative, and therefore should not be construed as being limiting in any way.

Although not separately illustrated in FIG. 3, the clustering engine 108 also can be configured to process the data associated with the cell clusters 118 after clustering. In particular, the clustering engine 108 can be configured to split one cell cluster 118 into two or more sub-clusters based on various considerations (e.g., based on computation and/or storage resources needed to build a model 120 associated with the cell cluster 118, data storage considerations, combinations thereof, or the like). In some embodiments, this processing can be referred to as "post-processing" as the processing can occur after clustering. It should be understood that this example is illustrative, and therefore should not be construed as being limiting in any way.

From operation 306, the method 300 can proceed to operation 308. At operation 308, the computing device 102 can train or otherwise create one or more artificial intelligence and/or machine learning models, such as the models 120. According to various embodiments of the concepts and technologies disclosed herein, one or more models 120 can be created for the cell clusters 118. In various embodiments, one model 120 can be trained and built for each of the cell clusters 118. Thus, it can be appreciated that in some embodiments the number of cell clusters 118 determined in operation 304 can correspond to a number of models 120 created in operation 308. It should be understood that this example is illustrative, and therefore should not be construed as being limiting in any way.

According to various embodiments of the concepts and technologies disclosed herein, instead of training and/or building a machine learning model and/or an artificial intelligence model for each base station or cell 114, embodiments of the concepts and technologies disclosed herein can include training and/or building a machine learning and/or artificial intelligence model for each cell cluster 118. Thus, some embodiments of the concepts and technologies disclosed herein can help reduce a burden of computations and required resources associated with training, building, and/or using a machine learning and/or artificial intelligence model for each base station and/or cell 114. It should be understood that this example is illustrative, and therefore should not be construed as being limiting in any way.

From operation 308, the method 300 can proceed to operation 310. At operation 310, the computing device 102 can generate one or more input clusters 122. In various embodiments, the number of input clusters 122 can correspond to the number of cell clusters 118. For example, the input data associated with cells 114 included in a particular cell cluster 118 can be combined into an input cluster 122. Thus, the functionality of operation 310 can correspond to grouping input data into an input cluster 122. It should be understood that this example is illustrative, and therefore should not be construed as being limiting in any way.

In some embodiments of the concepts and technologies disclosed herein, generating input clusters 122 can include reducing a number of predictions and/or estimations that may be generated using a particular model 120 (or multiple models 120) by grouping (or clustering) inputs with similar structure and/or signatures into an input cluster 122. The input cluster 122 can include multiple data points (e.g., corresponding to multiple inputs). When predicting output from the model 120 using the input clusters 122, embodiments of the concepts and technologies disclosed herein can include applying a prediction and/or estimation on one single data point of each input cluster 122 (e.g., a mean data point, an average data point, a centroid data point, or the otherwise selected data point).

From operation 310, the method 300 can proceed to operation 312. At operation 312, the computing device 102 can provide a value (e.g., a mean value, an average value, a centroid value, etc.) that can be selected from an input cluster 122 to a model 120 to predict output for a cell cluster 118 associated with the model 120. According to various embodiments of the concepts and technologies disclosed herein, the model 120 can be configured to receive a value (e.g., a mean value, an average value, a centroid value, etc.) that can be selected from an input cluster 122 as input, to perform operations on the value, and to generate output from the model 120. The output from the model 120 can correspond, in various embodiments, to predicted output 124 for the associated cell cluster 118.

In some embodiments, the predicted output 124 can be generated in operation 312. As explained above with reference to FIG. 1, the functionality of the computing device 102 illustrated in operation 312 can be iterated and/or otherwise repeated any number of times. For example, the computing device 102 can generate predicted output 124 for a particular cell cluster 118 over various types of input represented by one or more (or all of) the various input clusters 122. In some other embodiments, the computing device 102 can generate predicted output 124 for a particular value associated with an input cluster 122 over various types of cells 114 represented by one or more (or all of) the models 120 associated with the cell clusters 118. In yet other embodiments, the computing device 102 can generate predicted output 124 for the cellular network 116 in general over the various types of inputs represented by the input clusters 122 over the various types of cells 114 represented by the models 120 associated with the cell clusters 118. It should be understood that this example is illustrative, and therefore should not be construed as being limiting in any way.

From operation 312, the method 300 can proceed to operation 314. The method 300 can end at operation 314.

Figure 4:
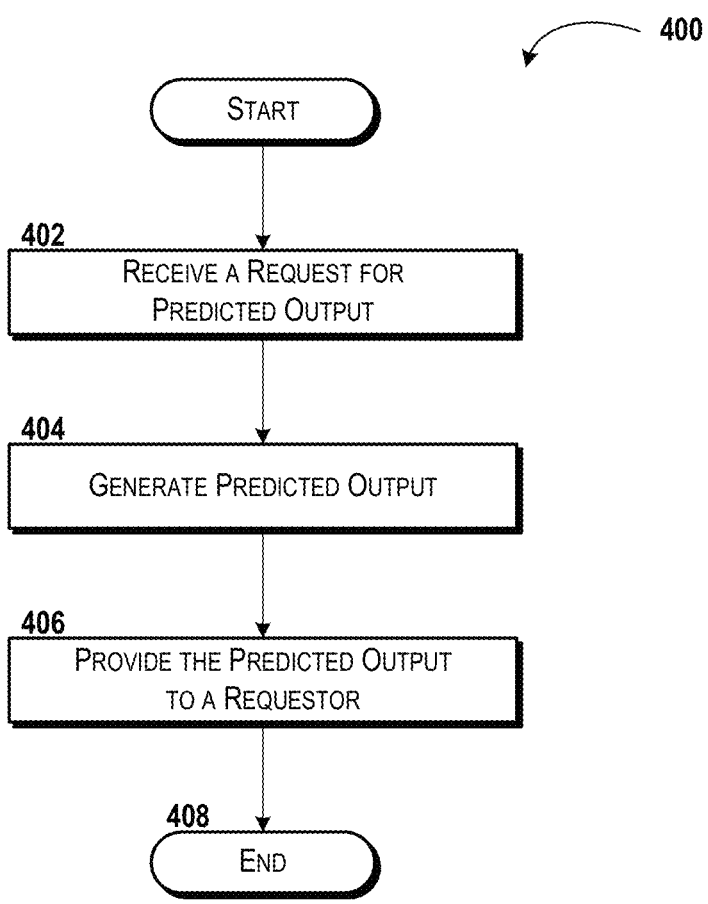
FIG. 4 is a flow diagram showing aspects of a method for providing predicted output to a requestor, according to an illustrative embodiment of the concepts and technologies described herein.

Turning now to FIG. 4, aspects of a method 400 for providing predicted output 124 to a requestor will be described in detail, according to an illustrative embodiment. The method 400 can begin at operation 402. At operation 402, the computing device 102 can receive a request for predicted output 124. In some embodiments, operation 402 can correspond to the computing device 102 receiving a predicted output request 128.

In some other embodiments, the functionality of the computing device 102 illustrated in operation 402 can correspond to a device such as, for example, the user device 126, interacting with the computing device 102 via an API, a portal, a web page, or the like. In yet other embodiments of the concepts and technologies disclosed herein, the functionality of the computing device 102 illustrated in operation 402 can correspond to a device (e.g., the user device 126) generating and/or sending a service request or call to or with the computing device 102. Because the request received in operation 402 can be created and/or sent to the computing device 102 in additional and/or alternative manners, it should be understood that these examples are illustrative, and therefore should not be construed as being limiting in any way.

From operation 402, the method 400 can proceed to operation 404. At operation 404, the computing device 102 can generate the predicted output 124. According to various embodiments, the computing device 102 can provide a value (e.g., a mean value, an average value, a centroid value, etc.) that can be selected from an input cluster 122 to a model 120 associated with a cell cluster 118 to generate the predicted output 124. In some embodiments, as explained above with reference to FIG. 1, the functionality of the computing device 102 illustrated in operation 404 can be iterated and/or otherwise repeated any number of times.

For example, the computing device 102 can generate predicted output 124 for a particular cell cluster 118 over various types of input represented by one or more (or all of) the various input clusters 122. In some other embodiments, the computing device 102 can generate predicted output 124 for a particular a value (e.g., a mean value, an average value, a centroid value, etc.) that can be selected from an input cluster 122 over various types of cells 114 represented by one or more (or all of) the models 120 associated with one or more (or all of) the various cell clusters 118. In yet other embodiments, the computing device 102 can generate predicted output 124 for the cellular network 116 in general over the various types of inputs represented by the input clusters 122 over the various types of cells 114 represented by the cell clusters 118. It should be understood that this example is illustrative, and therefore should not be construed as being limiting in any way.

From operation 404, the method 400 can proceed to operation 406. At operation 406, the computing device 102 can provide the predicted output 124 to a requestor (e.g., the requestor that generated the request received in operation 402). In some embodiments of the concepts and technologies disclosed herein, the computing device 102 can send the predicted output 124 to the user device 126 (or other device or entity that requested the predicted output 124 in operation 402) as a file or the like.

In some other embodiments, the computing device 102 can trigger the delivery of the predicted output 124 to the user device 126 (or other device or entity that requested the predicted output 124 in operation 402). In some other embodiments, the computing device 102 can make the predicted output 124 available via a web page, a download or other data session, or the like. Because the predicted output 124 can be delivered to the user device 126 (or other device or entity that requested the predicted output 124 in operation 402) in additional and/or alternative manners, it should be understood that these examples are illustrative, and therefore should not be construed as being limiting in any way.

From operation 406, the method 400 can proceed to operation 408. The method 400 can end at operation 408.

Figure 5:
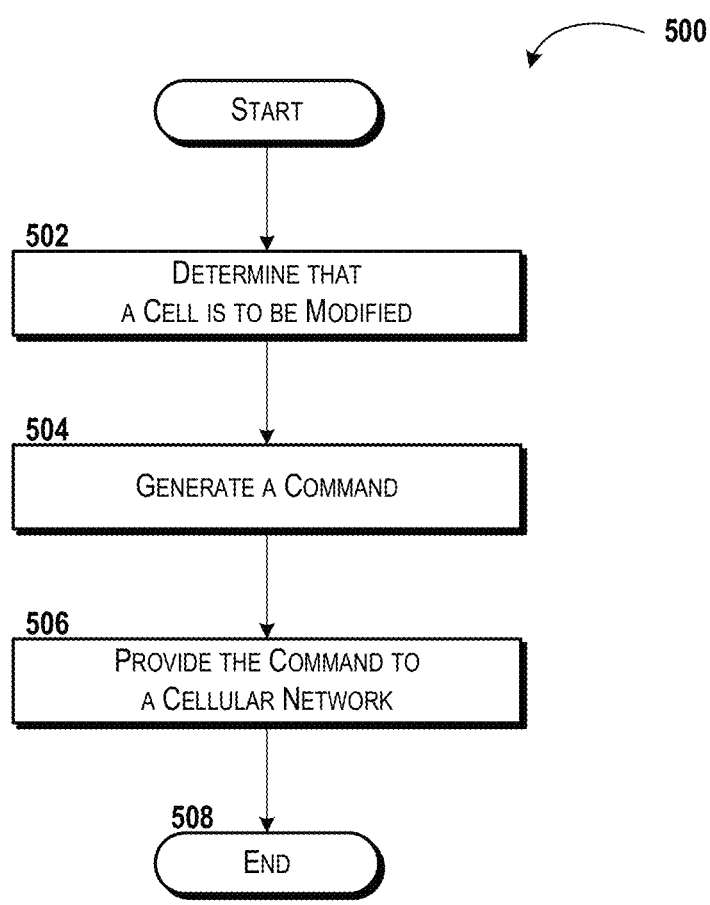
FIG. 5 is a flow diagram showing aspects of a method for managing a cellular network using cell clusters, according to an illustrative embodiment of the concepts and technologies described herein.

Turning now to FIG. 5, aspects of a method 500 for managing a cellular network 116 using cell clusters 118 will be described in detail, according to an illustrative embodiment. The method 500 can begin at operation 502. At operation 502, the computing device 102 can determine that a cell 114 is to be modified. For example, the computing device 102 can determine, based on the predicted output 124 that can be generated as illustrated and described herein, that a cell 114 is to be modified. In one contemplated embodiment, the predicted output 124 may indicate that a received signal may be inadequate based on a transmission power associated with the cell 114 (as modeled in the model 120).

Thus, computing device 102 can determine that the transmission power or other operating characteristic of a component of the cell 114 should be increased or otherwise modified to improve RSP.

In another contemplated example, the predicted output 124 may indicate that no signal will be received by a user equipment or other device operating at a particular location due to a tilt of an antenna associated with a particular cell 114. Thus, the computing device 102 can determine, for example, that a tilt of an antenna should be modified based on this determination. Because many other modifications to the cells 114 and/or components thereof may be made, it should be understood that the above examples are illustrative, and therefore should not be construed as being limiting in any way.

From operation 502, the method 500 can proceed to operation 504. At operation 504, the computing device 102 can generate one or more commands (e.g., the commands 130 illustrated and described herein). The commands 130 can, when received by the cellular network 116 and/or one or more components thereof, cause the cellular network 116 and/or the component thereof to implement a modification to one or more of the cells 114. It can be appreciated with reference to the two examples described above with respect to operation 502 that the commands 130 can instruct a cell 114 or component associated therewith to adjust a tilt or a transmission power, for example. Because other modifications may be made to the cells 114 and/or components thereof, it should be understood that these examples of the commands 130 are illustrative and therefore should not be construed as being limiting in any way.

From operation 504, the method 500 can proceed to operation 506. At operation 506, the computing device 102 can provide (or trigger delivery of) the one or more commands 130 to a cellular network 116, a component thereof, and/or a component associated therewith. For example, the commands 130 generated in operation 504 can be provided by the computing device 102 (or another device) to a cellular network management entity 132. At operation 506, the computing device 102 can provide the command 130 to the cellular network 116 and/or one or more components thereof (e.g., one or more of the cells 114, the cellular network management entity 132, or the like). In some other embodiments, the computing device 102 can trigger the delivery of the command 130 to the cellular network 116 and/or one or more components thereof (e.g., one or more of the cells 114, the cellular network management entity 132, or the like). Because the command 130 can be delivered to the cellular network 116 and/or one or more components thereof in additional and/or alternative manners, it should be understood that these examples are illustrative, and therefore should not be construed as being limiting in any way.

From operation 506, the method 500 can proceed to operation 508. The method 500 can end at operation 508.

Figure 6:
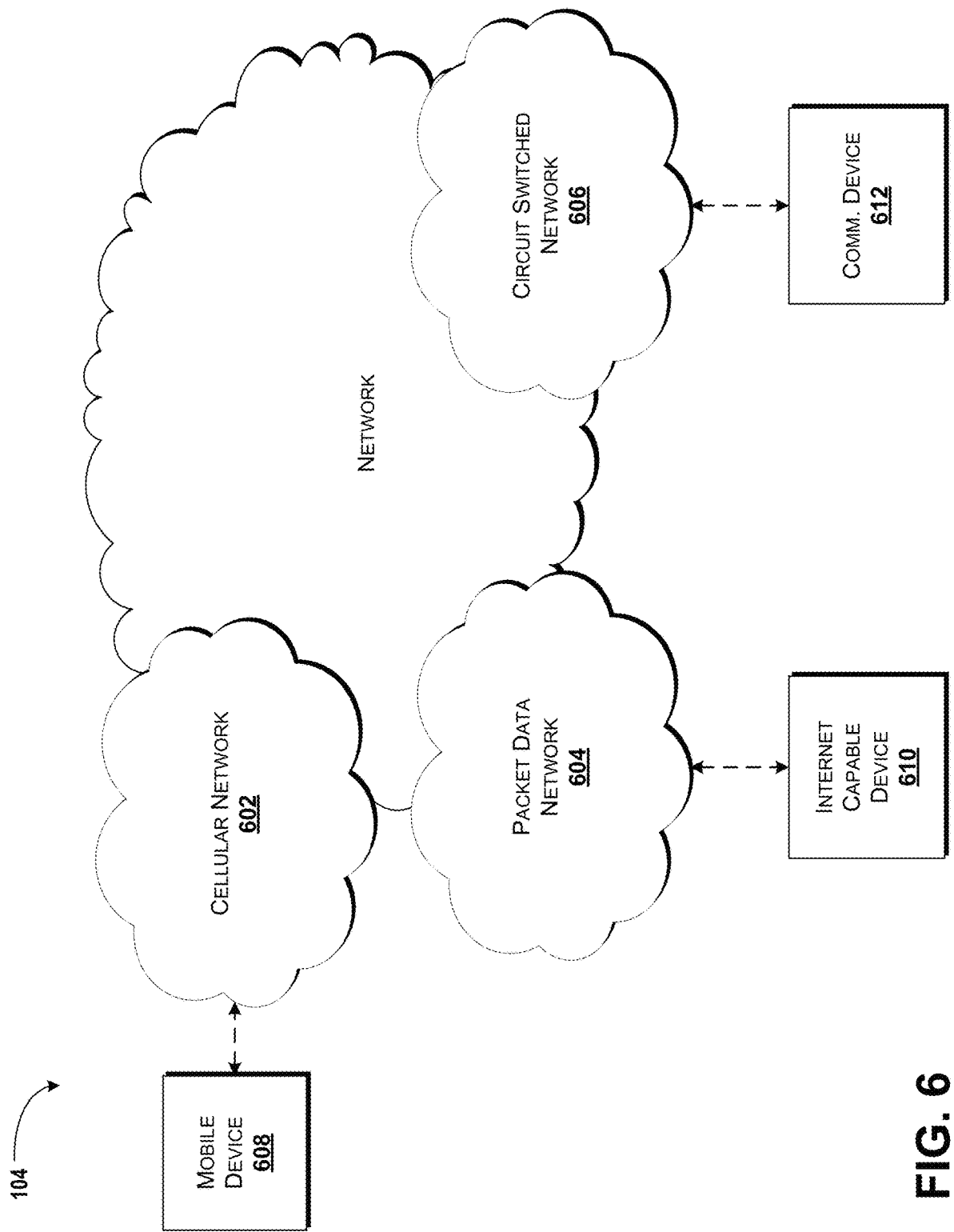
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), NodeB's, eNodeB's, gNodeB's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+.

The cellular network 602 also is compatible with 4G mobile communications standards, 4.5G mobile communications standards, 5G mobile communications standards, as well as evolved and future mobile standards. According to some embodiments of the concepts and technologies disclosed herein, the cellular network 602 and/or the cellular network 116 can be the same network. According to some embodiments of the concepts and technologies disclosed herein, the cellular network 602 and the cellular network 116 can include and/or can be configured as 5G mobility networks. It should be understood that this example is illustrative, and therefore should not be construed as being limiting in any way.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
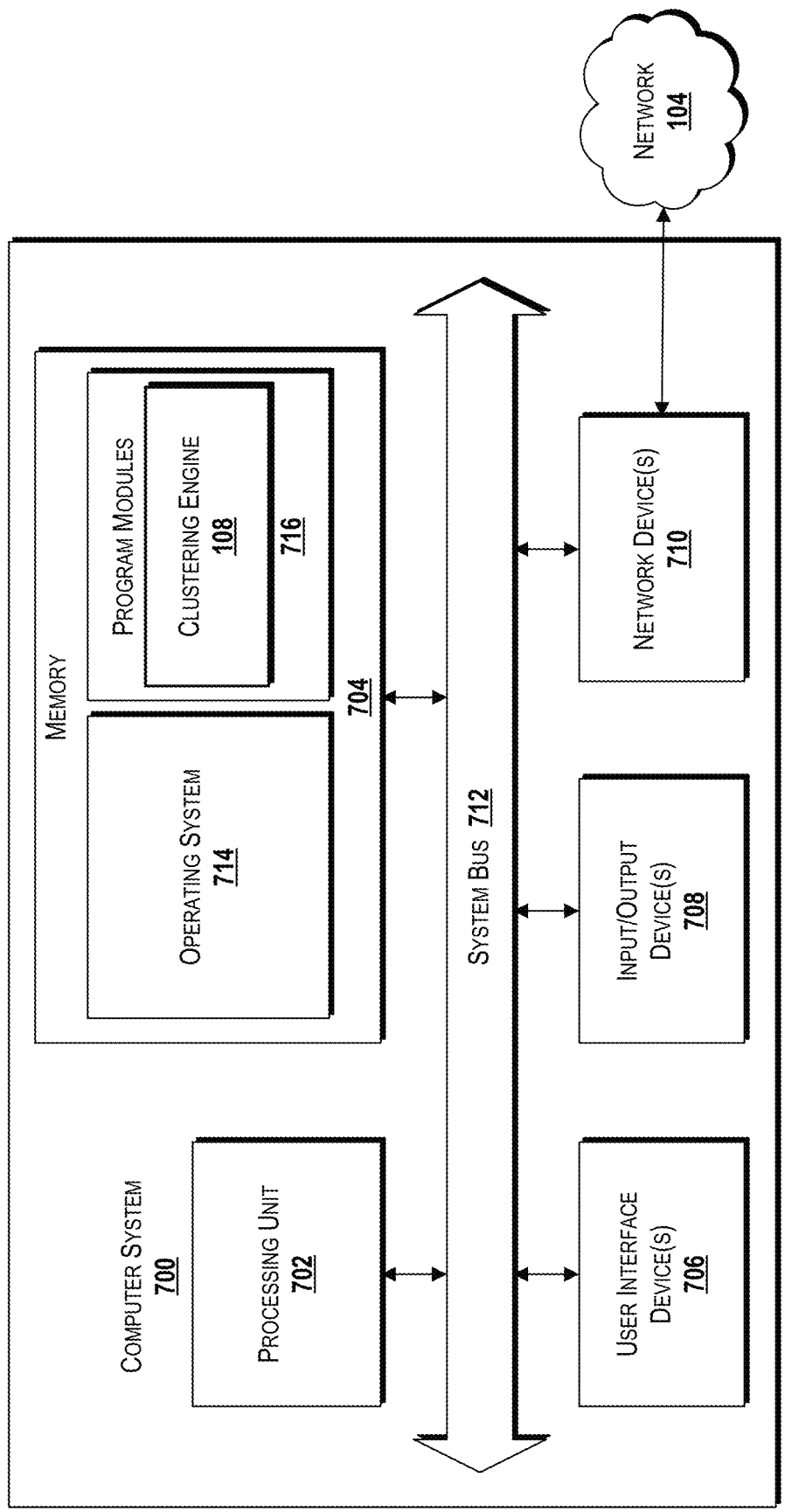
FIG. 7 is a block diagram illustrating an example computer system configured to create and use cell clusters, according to some illustrative embodiments of the concepts and technologies described herein.

FIG. 7 is a block diagram illustrating a computer system 700 configured to provide the functionality described herein for creating and using cell clusters, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the clustering engine 108. This and/or other programs can be embodied in computer-readable media containing instructions that, when executed by the processing unit 702, perform one or more of the methods 300, 400, and/or 500 described in detail above with respect to FIGS. 3-5 and/or other functionality as illustrated and described herein. It can be appreciated that, at least by virtue of the instructions embodying the methods 300, 400, 500, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the cellular network data 112, the cell clusters 118, the input clusters 122, the models 120, the predicted output 124, the predicted output request 128, the command 130, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
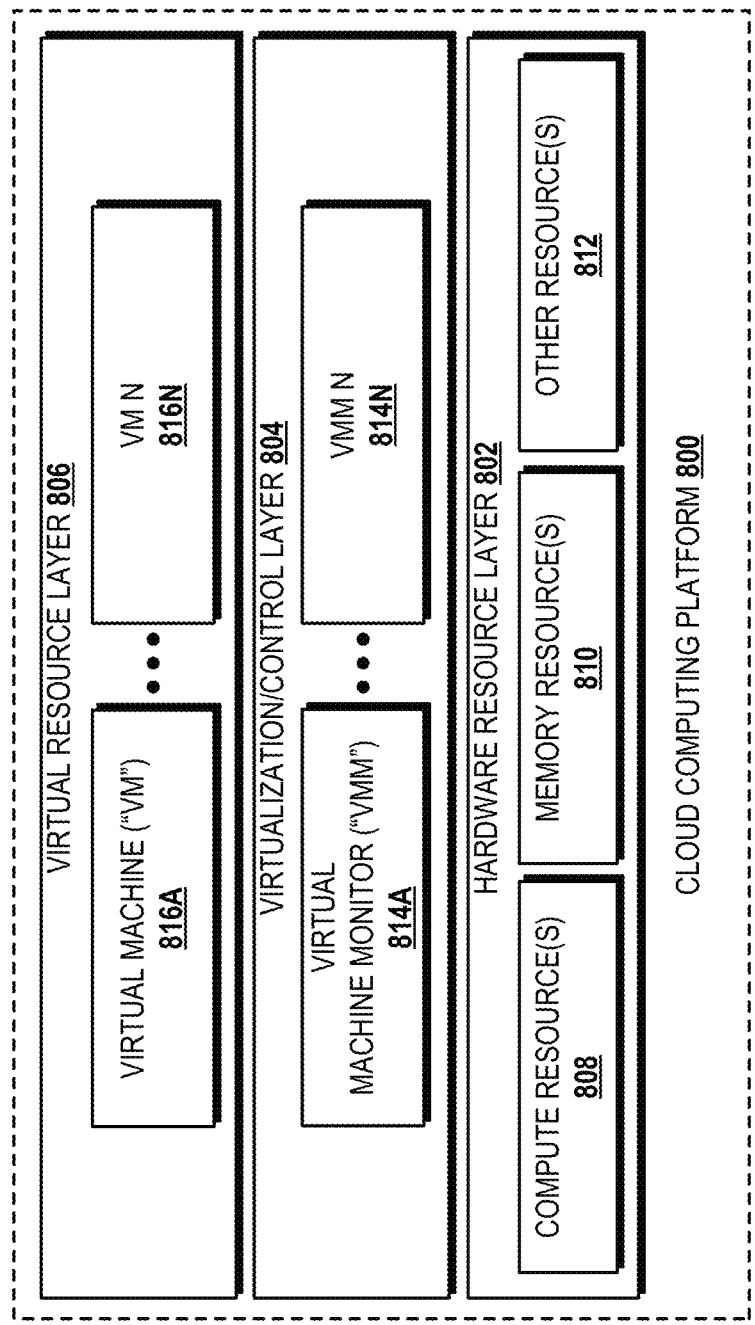
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for creating and using cell clusters 118 and/or for interacting with the clustering engine 108. Thus, it can be appreciated that in some embodiments of the concepts and technologies disclosed herein, the cloud computing platform 800 illustrated in FIG. 8 can be used to provide the functionality described herein with respect to the computing device 102, the user device 126, or other devices illustrated and described herein.

The cloud computing platform 800 thus may be utilized to execute any aspects of the software components presented herein. Thus, according to various embodiments of the concepts and technologies disclosed herein, the clustering engine 108 can be implemented, at least in part, on or by one or more elements included in the cloud computing platform 800 illustrated and described herein. Those skilled in the art will appreciate that the illustrated cloud computing platform 800 is a simplification of but only one possible implementation of an illustrative cloud computing platform, and as such, the cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform architecture to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 806 can include one or more hardware components that can perform computations to process data, and/or to execute computer-executable instructions of one or more application programs, operating systems, services, and/or other software including, but not limited to, the clustering engine 108 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that the SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the clustering engine 108 or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the cellular network data 112, the cell clusters 118, the input clusters 122, the models 120, the predicted output 124, the predicted output request 128, the commands 130, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors," hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for creating and using cell clusters have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
obtaining cellular network data associated with a cellular network, the cellular network data comprising configuration data associated with a cell of the cellular network, an input at the cell of the cellular network, and a performance indicator associated with the cell of the cellular network,
determining, based on the cellular network data, a number of cell clusters to be generated,
generating, based on the cellular network data and based on the number, the cell clusters, the cell clusters comprising a cell cluster that represents a plurality of cells comprising the cell,
training a model that represents the cell cluster,
generating, based on the cellular network data, an input cluster that represents a plurality of inputs comprising the input, wherein the plurality of inputs are associated with the plurality of cells, and wherein a value represents the plurality of inputs, and
providing the value as input to the model to obtain a predicted output associated with the cell cluster.

2. The system of claim 1, wherein the computer-executable instructions, when executed by the processor, cause the processor to perform operations further comprising:
determining, based on the predicted output, that an operation of the cell is to be modified;
generating a command that, when received by a device associated with the cell, causes the device to modify the operation of the cell; and
triggering delivery of the command to the device.

3. The system of claim 2, wherein generating the cell cluster comprises clustering the plurality of cells based on the configuration data and data acquired from an internal source and an external source.

4. The system of claim 3, wherein generating the input cluster comprises clustering the plurality of inputs associated with the plurality of cells.

5. The system of claim 1, wherein the value comprises a function of an input value associated with the plurality of inputs.

6. The system of claim 1, wherein the model comprises machine learning and artificial intelligence models including a neural network, a deep neural network, and a reinforcement learning model, and wherein the model is adaptively trained on the cellular network data.

7. A method comprising:
obtaining, at a computing device comprising a processor, cellular network data associated with a cellular network, the cellular network data comprising configuration data associated with a cell of the cellular network, an input at the cell of the cellular network, and a performance indicator associated with the cell of the cellular network;
determining, by the processor and based on the cellular network data, a number of cell clusters to be generated;
generating, by the processor and based on the cellular network data and based on the number, the cell clusters, the cell clusters comprising a cell cluster that represents a plurality of cells comprising the cell;
training, by the processor, a model that represents the cell cluster;
generating, by the processor and based on the cellular network data, an input cluster that represents a plurality of inputs comprising the input, wherein the plurality of inputs are associated with the plurality of cells, and wherein a value represents the plurality of inputs; and
providing, by the processor, the value as input to the model to obtain a predicted output associated with the cell cluster.

8. The method of claim 7, further comprising:
determining, based on the predicted output, that an operation of the cell is to be modified;
generating a command that, when received by a device associated with the cell, causes the device to modify the operation of the cell; and
triggering delivery of the command to the device.

9. The method of claim 8, wherein generating the cell cluster comprises clustering the plurality of cells based on the configuration data and data acquired from an internal source and an external source.

10. The method of claim 9, wherein generating the input cluster comprises clustering the plurality of inputs associated with the plurality of cells.

11. The method of claim 7, wherein the value comprises a function of an input value associated with the plurality of inputs.

12. The method of claim 7, wherein the model comprises machine learning and artificial intelligence models including a neural network, a deep neural network, and a reinforcement learning model.

13. The method of claim 12, wherein the model is adaptively trained on the cellular network data.

14. A computer storage medium having computer-executable instructions stored thereon that, when executed by a processor, cause the processor to perform operations comprising:
obtaining cellular network data associated with a cellular network, the cellular network data comprising configuration data associated with a cell of the cellular network, an input at the cell of the cellular network, and a performance indicator associated with the cell of the cellular network;
determining, based on the cellular network data, a number of cell clusters to be generated;
generating, based on the cellular network data and based on the number, the cell clusters, the cell clusters comprising a cell cluster that represents a plurality of cells comprising the cell;
training a model that represents the cell cluster;
generating, based on the cellular network data, an input cluster that represents a plurality of inputs comprising the input, wherein the plurality of inputs are associated with the plurality of cells, and wherein a value represents the plurality of inputs; and providing the value as input to the model to obtain a predicted output associated with the cell cluster.

15. The computer storage medium of claim 14, wherein the computer-executable instructions, when executed by the processor, cause the processor to perform operations further comprising:
   determining, based on the predicted output, that an operation of the cell is to be modified;
   generating a command that, when received by a device associated with the cell, causes the device to modify the operation of the cell; and
   triggering delivery of the command to the device.

16. The computer storage medium of claim 15, wherein generating the cell cluster comprises clustering the plurality of cells based on the configuration data and data acquired from an internal source and an external source.

17. The computer storage medium of claim 16, wherein generating the input cluster comprises clustering the plurality of inputs associated with the plurality of cells.

18. The computer storage medium of claim 14, wherein the value comprises a function of an input value associated with the plurality of inputs.

19. The computer storage medium of claim 14, wherein the model comprises machine learning and artificial intelligence models including a neural network, a deep neural network, and a reinforcement learning model.

20. The computer storage medium of claim 19, wherein the model is adaptively trained on the cellular network data.

* * * * *